(12) United States Patent
Boeck

(10) Patent No.: US 10,655,490 B2
(45) Date of Patent: May 19, 2020

(54) SEAL ARRANGEMENT FOR A GAS TURBINE

(71) Applicant: MTU Aero Engines AG, Munich (DE)

(72) Inventor: Alexander Boeck, Kottgeisering (DE)

(73) Assignee: MTU AERO ENGINES AG, Munich (DE)

( * ) Notice: Subject to any disclaimer, the term of this patent is extended or adjusted under 35 U.S.C. 154(b) by 139 days.

(21) Appl. No.: 15/893,906

(22) Filed: Feb. 12, 2018

(65) Prior Publication Data

US 2018/0238187 A1 Aug. 23, 2018

(30) Foreign Application Priority Data

Feb. 17, 2017 (EP) ..................................... 17156720

(51) Int. Cl.
*F01D 11/00* (2006.01)
*F16J 15/08* (2006.01)
(Continued)

(52) U.S. Cl.
CPC .............. *F01D 11/005* (2013.01); *F01D 9/04* (2013.01); *F01D 11/006* (2013.01); *F16J 15/02* (2013.01); *F16J 15/08* (2013.01); *F01D 11/08* (2013.01); *F01D 25/246* (2013.01); *F05D 2220/32* (2013.01); *F05D 2240/11* (2013.01); *F05D 2240/55* (2013.01); *F05D 2240/57* (2013.01);
(Continued)

(58) Field of Classification Search
CPC ........ F01D 11/005; F01D 11/006; F01D 9/04; F05D 2240/11; F05D 2240/55; F05D 2240/57; F16J 15/02; F16J 15/08; F16J 15/44; F16J 15/441; F16J 15/442; F16J 15/445

See application file for complete search history.

(56) References Cited

U.S. PATENT DOCUMENTS 6,893,214 B2 * 5/2005 Alford ...................... F01D 9/04
 415/138
6,895,757 B2 * 5/2005 Mitchell ............... F01D 11/005
 60/753

(Continued)

FOREIGN PATENT DOCUMENTS

EP 2851518 A1 3/2015
EP 3061603 A1 8/2016
(Continued)

*Primary Examiner* — Ninh H. Nguyen
*Assistant Examiner* — Behnoush Haghighian
(74) *Attorney, Agent, or Firm* — Abel Schillinger, LLP

(57) ABSTRACT

A seal arrangement comprising a first and second components made of a ceramic fiber composite material and comprising first and second bounding sections with first and second overlapping sections and first and second securing sections which are connected to and projects from the first and second bounding sections. The first and second overlapping sections are arranged at least partially overlapping such that the first and second bounding sections form an essentially continuous bounding surface. A separation between the first and second securing sections is at least partially sealed by a seal element which comprises at least one first sheet-metal element arranged along the first securing section and at least partially bridging the separation between the first and second securing sections.

19 Claims, 4 Drawing Sheets

(51) Int. Cl.
  *F01D 9/04*  (2006.01)
  *F16J 15/02* (2006.01)
  *F01D 11/08*  (2006.01)
  *F01D 25/24*  (2006.01)
(52) U.S. Cl.
  CPC ... *F05D 2300/6033* (2013.01); *F16J 15/0887* (2013.01); *Y02T 50/672* (2013.01)

(56) References Cited

U.S. PATENT DOCUMENTS

| | | | |
|---|---|---|---|
| 9,784,213 B2* | 10/2017 | Todorovic | F02K 1/72 |
| 2008/0267768 A1* | 10/2008 | Dakowski | F01D 9/042 |
| | | | 415/115 |
| 2009/0079139 A1 | 3/2009 | Schiavo et al. | |
| 2012/0177489 A1* | 7/2012 | Batt | F01D 9/041 |
| | | | 415/202 |
| 2015/0086331 A1 | 3/2015 | Hess et al. | |
| 2016/0251272 A1 | 9/2016 | Weaver et al. | |
| 2016/0305286 A1 | 10/2016 | Heitman et al. | |
| 2017/0015595 A1 | 1/2017 | Weaver et al. | |
| 2018/0230839 A1* | 8/2018 | Gallier | F01D 11/02 |

FOREIGN PATENT DOCUMENTS

| | | | |
|---|---|---|---|
| EP | 3061740 A1 | 8/2016 | |
| EP | 3085904 A1 | 10/2016 | |

* cited by examiner

SEAL ARRANGEMENT FOR A GAS TURBINE

CROSS-REFERENCE TO RELATED APPLICATIONS

The present application claims priority under 35 U.S.C. § 119 of European Patent Application No. 17156720.9, filed Feb. 17, 2017, the entire disclosure of which is expressly incorporated by reference herein.

BACKGROUND OF THE INVENTION

1. Field of the Invention

The present invention relates to a seal arrangement comprising: a first component and a second component, the first component comprising a first bounding section with a first overlapping section and a first securing section that is connected to and projects from the bounding section, the second component comprising a second bounding section with a second overlapping section and a second securing section that is connected to and projects from the bounding section. The first overlapping section and the second overlapping section are arranged at least partially overlapping such that the first bounding section and the second bounding section form an essentially continuous bounding surface. Further, a separation is provided between the first securing section and the second securing section, which separation is at least partially sealed by at least one seal element.

2. Discussion of Background Information

Seal arrangements of the above type are used in particular in gas turbines, preferably in turbine intermediate casings of gas turbines. Hitherto, seal arrangements were created on so-called ground overlaps of two metal components using a feather seal. To that end, the adjacent, overlapping components were provided with slit-shaped blind bores which were produced for example by sinker electrical discharge machining. However, the production of such blind bores by sinker electrical discharge machining is possible only in electrically conductive materials. In the field of gas turbines, in particular the turbine intermediate casing for gas turbines, the use of alternative materials, for example ceramic fiber composite materials, is under increasing investigation in order to save weight and improve efficiency in comparison with conventional metal components.

Accordingly, conventional seal arrangements as described above are not an option for components made of alternative materials.

In view of the foregoing, it would be advantageous to have available a seal arrangement which avoids the above drawbacks in relation to alternative materials.

SUMMARY OF THE INVENTION

According to the invention it is proposed that the first component and the second component are made of a ceramic fiber composite material, and that the seal element comprises at least one first sheet-metal element which is arranged along the first securing section and at least partially bridges the separation between the first securing section and the second securing section.

In that context, the first sheet-metal element serves as a type of extension of the first securing section. Thus, the first sheet-metal element runs essentially along the first overlapping section such that the sheet-metal element can at least partially close an intermediate space existing between the first component and the second component. The provision of a first sheet-metal element which is arranged along the first securing section permits simple sealing of the intermediate space between the two components made of ceramic fiber composite materials (CMC).

The first sheet-metal element can completely bridge the separation. In that context, it is further possible for an engagement section of the second securing section to be received displaceably in the first sheet-metal element.

The seal element can also comprise at least one second sheet-metal element which is arranged along the second securing section and partially bridges the separation to the first securing section. To that end, it is proposed that a sealing body is received between the first sheet-metal element and the second sheet-metal element, which sealing body bridges a residual separation remaining between the first sheet-metal element and the second sheet-metal element.

Preferably, the first sheet-metal element and/or the second sheet-metal element is essentially U-shaped. In that context, the U shape can be designed such that the relevant sheet-metal element accommodates the respective first or second securing section between the two limbs of the U. Furthermore, the U shape can be configured such that the relevant sheet-metal element is open toward the overlapping section or toward the bounding section.

In the configuration already described above, wherein the first sheet-metal element completely bridges the separation to the second securing section, the engagement section of the second securing section is accommodated between the two limbs of the U-shaped first sheet-metal element.

In the configuration also already described, wherein a sealing body is provided between the first sheet-metal element and the second sheet-metal element, the body is accommodated, at its ends oriented toward the respective securing sections, between the limbs of the U-shaped first sheet-metal element and between the limbs of the U-shaped second sheet-metal element.

The first sheet-metal element and/or the second sheet-metal element may be connected to the relevant securing section by rivet connections. To that end, openings are provided in the respective first and/or second securing section. The openings can be formed as a circular hole or as a slot. The first and/or the second sheet-metal element can be made of any metallic or intermetallic material. Thus, it/they can also have a different thermal expansion coefficient to the first and/or the second component. The openings in the form of a slot make it possible to compensate for different thermal expansions.

An increased material thickness may be provided on the first overlapping section and/or on the second overlapping section. An increased material thickness of this kind serves in particular to permit mechanical rework on the CMC components, in the region of the overlap, without damaging the components. The increased material thickness therefore serves as a type of equalizer for laminate tolerances in the two components made of ceramic fiber composite materials.

The first component and the second component can be arranged in a turbine intermediate casing of a gas turbine such that the first bounding section and the second bounding section bound a hot gas duct, and such that the first securing section and the second securing section are connected to structural elements of the turbine intermediate casing. In that context, the first and second securing sections are oriented away from the hot gas duct, which has been described above with the feature that the securing sections project from the bounding sections.

The invention also provides a turbine intermediate casing for a gas turbine, in particular an aero gas turbine, having multiple components which are arranged next to one another in the circumferential direction, partially overlap one another and bound a hot gas duct, and comprising at least one seal arrangement as described above, the first component and the second component being in each case adjacent in the circumferential direction.

Indications of direction such as "axial" or "axially", "radial" or "radially", and "circumferential" are fundamentally to be understood as relating to the machine axis of the gas turbine, unless the context contains explicit or implicit indications otherwise.

In a turbine intermediate casing, the first securing section and the second securing section can project from the first bounding section and, respectively, from the second bounding section essentially in the radial direction.

There follows an exemplary and non-limiting description of the invention with reference to the appended drawings.

BRIEF DESCRIPTION OF THE DRAWINGS

In the appended drawings.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
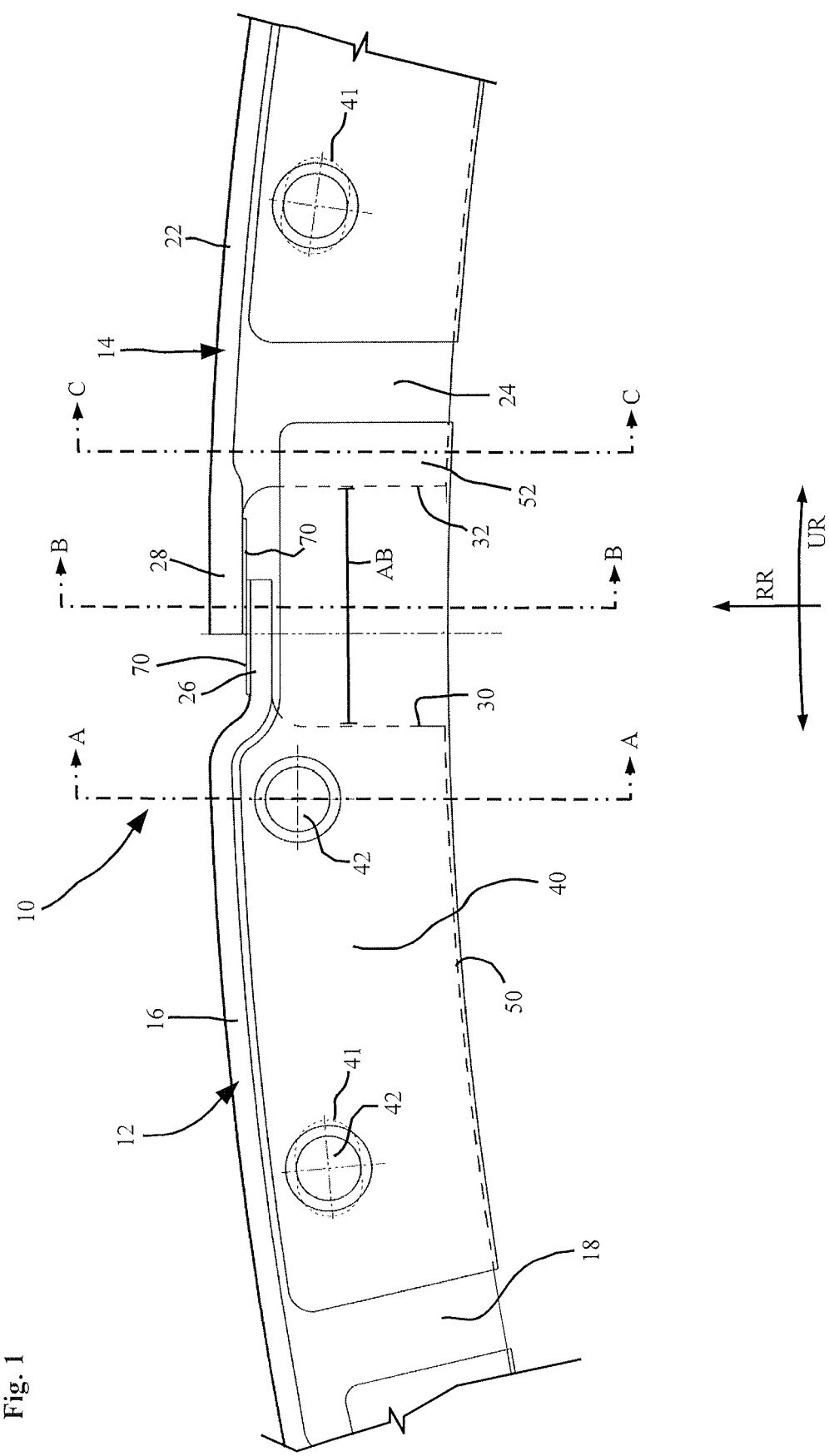
FIG. 1 shows one embodiment of a seal arrangement, in a simplified schematic view.

There follows a description of a seal arrangement 10 with reference to FIG. 1 and the associated sectional depictions of FIG. 2A) to 2C). FIG. 1 shows, in a frontal view, a seal arrangement 10 having a first component 12 and a second component 14. The two components 12, 14 may for example be part of a turbine intermediate casing (not depicted in greater detail here) of a gas turbine, in particular an aero gas turbine. Both components 12, 14 are produced from a ceramic fiber composite material (CMC).

Figure 2:
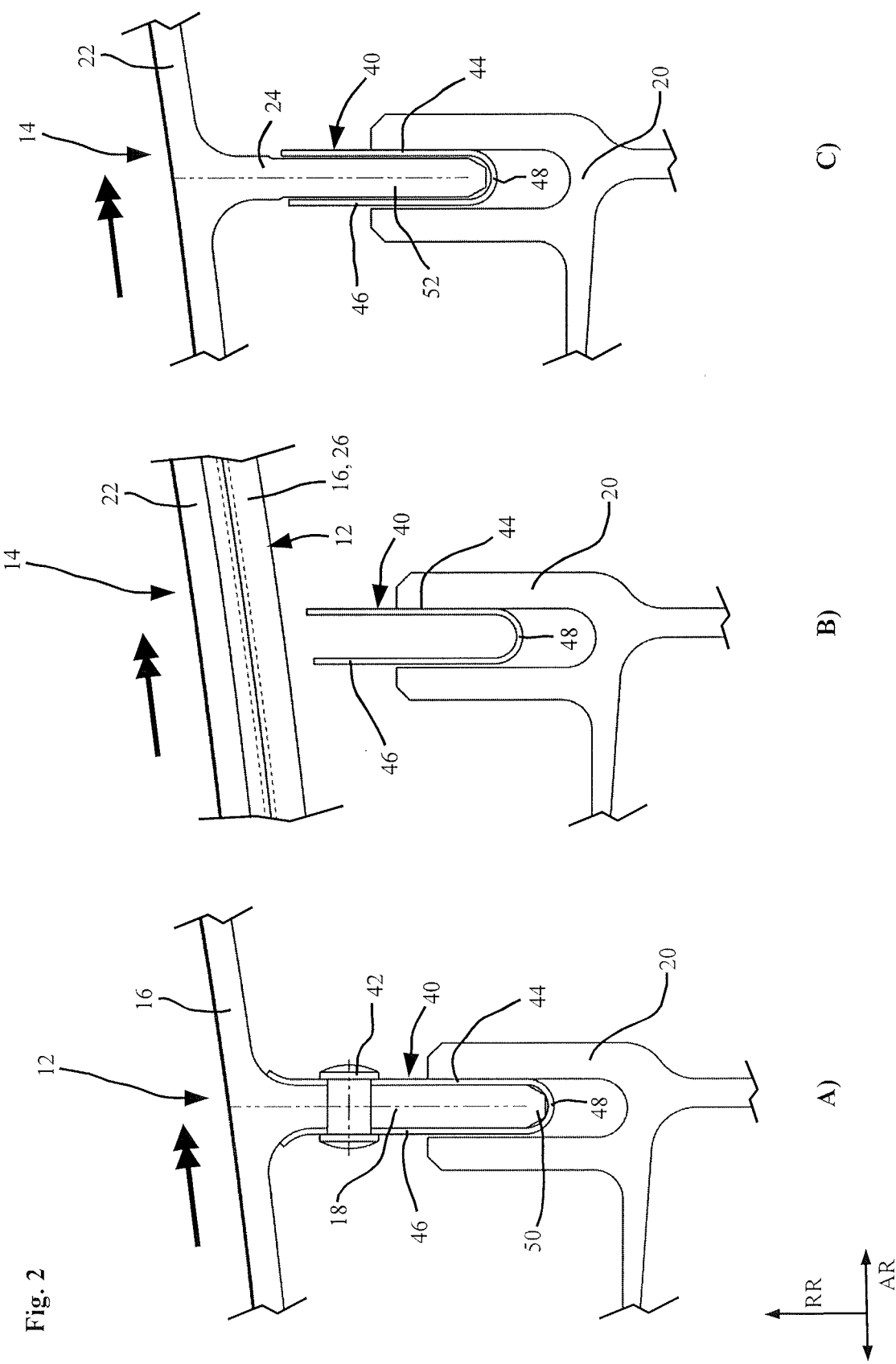
FIG. 2 shows, in partial figures A) to C), three cross-sectional depictions corresponding to section lines A-A, B-B and C-C of FIG. 1

The first component 12 has a bounding section 16 and a securing section 18 projecting from the bounding section 16. The securing section 18 serves, in particular, to allow the first component 12 to be connected to higher-level structural components 20 (FIG. 2). The first securing section 18 and the first bounding section 16 make the first component 12 essentially T-shaped. The second component 14 also has a bounding section 22 and a securing section 24 projecting from the bounding section 22. The securing section 24 serves, in particular, to allow the second component 14 to be connected to higher-level structural components 20 (FIG. 2). The second securing section 24 and the second bounding section 22 make the second component 14 essentially T-shaped.

The first component 12, and in particular the bounding section 16 thereof, has a first overlapping section 26. The first overlapping section 26 is on another level relative to the remainder of the bounding section 16. In particular, the first overlapping section 26 is lower, in a height direction RR which can for example also be the radial direction RR of a gas turbine, or radially further inward than the remaining bounding section 16. The second component 14, and in particular the bounding section 22 thereof, has a second overlapping section 28. The second overlapping section 28 is on the same level as the remainder of the second bounding section 22. In particular, the second overlapping section 28 is at the same height, in a height direction RR which can for example also be the radial direction RR of a gas turbine, or at essentially the same radial distance from a machine axis (not shown) as the remaining second bounding section 22.

The first overlapping section 26 and the second overlapping section 28 extend in the longitudinal direction UR, which can for example also be the circumferential direction UR of a gas turbine, beyond the respective first securing section 18 or the second securing section 24. If the first component 12 and the second component 14 are arranged next to one another, their respective overlapping sections 26, 28 overlap. A separation AB is formed between a first end 30 of the first securing section 18 and a second end 32 of the second securing section 24.

In the case of the seal arrangement 10 as depicted in FIG. 1 and FIG. 2, the separation AB between the first component 12 and the second component 14 is completely bridged by a first sheet-metal element 40. The first sheet-metal element 40 has an essentially U-shaped profile in cross section (FIG. 2). The first sheet-metal element 40 is connected to the first component 12, and in particular to the securing section 18 thereof, by means of rivet connections 42. In other words, it can also be said that the first securing section 18 is surrounded or enclosed by the sheet-metal element 40. In that context, the U-shaped profile of the first sheet-metal element 40 is designed such that the two limbs 44, 46 of the U extend along the securing section. The arc 48 of the U is located at an underside 50, or a radial inner side 50, of the first component 12. The first sheet-metal element 40 thus has a profile which is open at the top, or radially outward, or toward the bounding section 16.

The second component 14, and in particular the securing section 24 thereof, is accommodated displaceably in the first sheet-metal element 40. In other words, an engagement section 52 of the second securing section 24 is accommodated in the first sheet-metal element 40. The seal arrangement 10 depicted here allows the two components 12, 14 to move relative to one another, and in particular permits thermal expansions to be compensated for, the transition from the first component 12 to the second component 14 being essentially sealed by the two overlapping regions 26, 28 and the first sheet-metal element 40.

Sealing of this kind is of particular importance when the first component 12 and the second component 14 are part of a turbine intermediate casing of a gas turbine. In such a case, the bounding sections 16, 22 bound an annular hot gas duct. The flow direction of hot gas is indicated in a simplified manner in FIG. 2 by a double arrow. Fluid flows also arise on the side oriented away from the hot gas duct, which side is in the present example located radially inward. These fluid flows can be influenced or reduced by the sheet-metal element 40 in the region of the transition from the first component to the second component 14, which components are arranged with the separation AB between them. Thus, the first sheet-metal element 40 forms a sealing element for these fluid flows. The seal arrangement 10 presented here thus makes it possible to seal the hot gas duct and also to provide a seal for other fluid flows at the transition point between the first component 12 and the second component 14. Multiple examples of the seal arrangement 10 depicted in FIG. 1 can be provided in a turbine intermediate casing, with multiple seal arrangements being arranged distributed along the circumference.

The first sheet-metal element 40 can be made of any metallic or intermetallic material. Thus, it can also have a different thermal expansion coefficient to the first and the second component 12, 14. Slot-shaped openings 41 (shown by dashed lines) can be provided in the first and/or second component 12, 14 in order to compensate for any differences in the expansion of the first sheet-metal element 40 and the first and/or second component 12, 14. The first component 12 and the second component 14 may be of identical design, with the circumferential-side ends of a component 12, 14 differing from one another, as described above.

Figure 3:
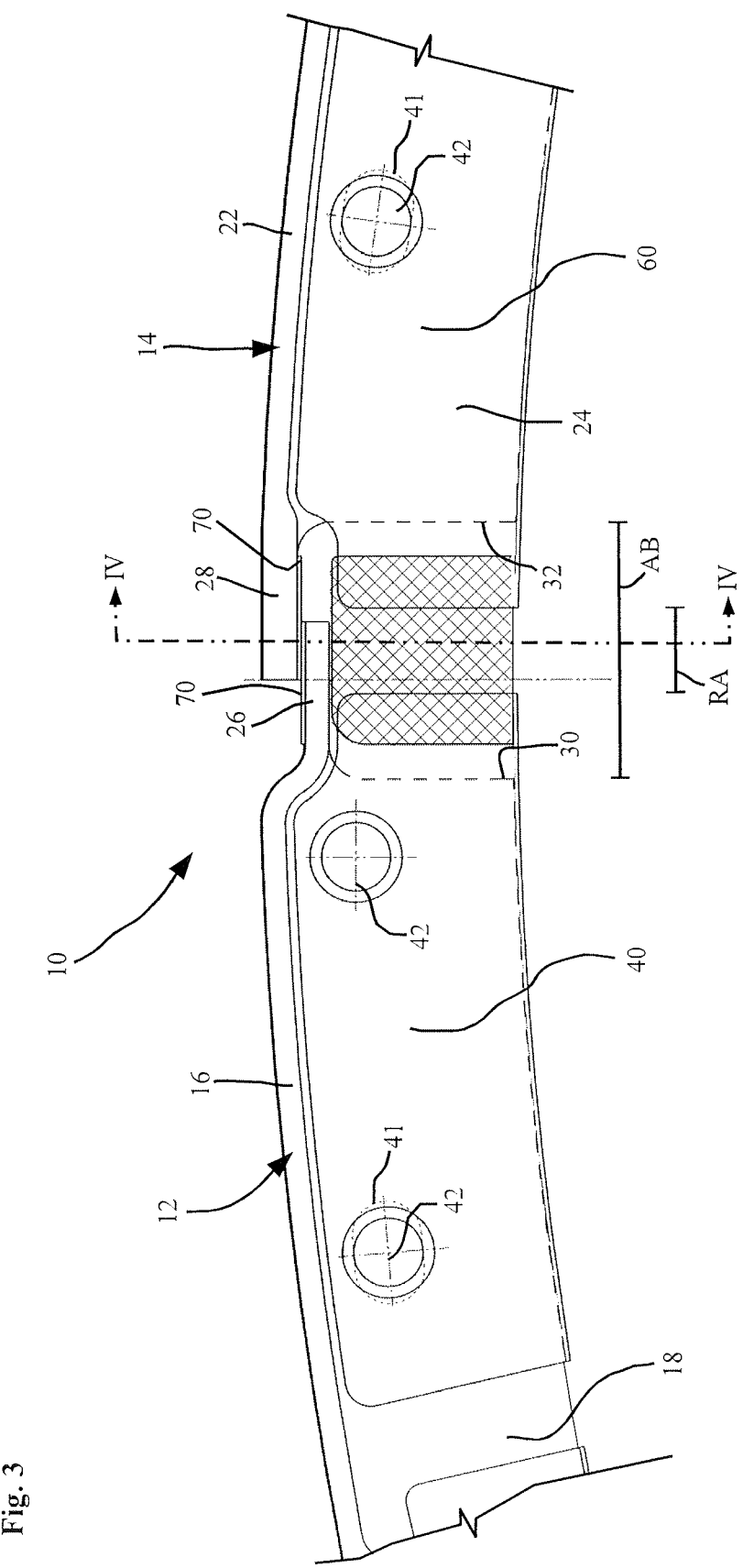
FIG. 3 shows another embodiment of a seal arrangement with a sealing body, in a simplified and schematic view.
Figure 4:
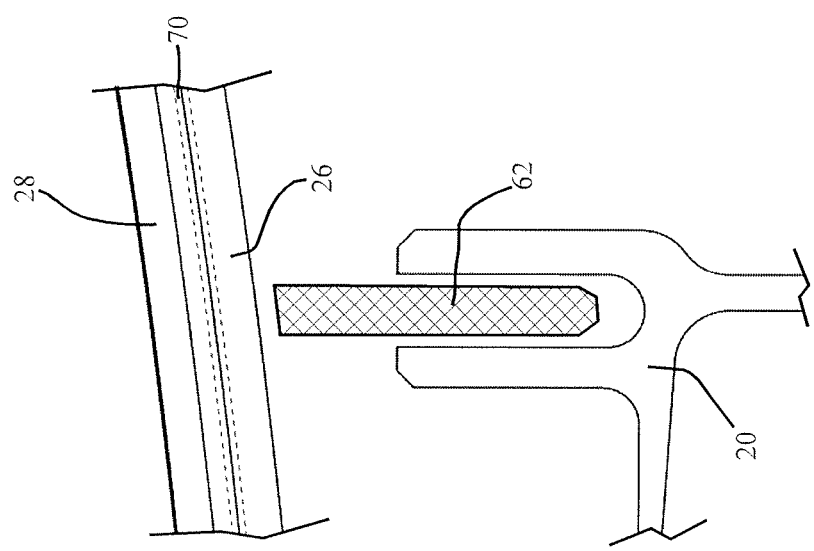
FIG. 4 shows a sectional depiction corresponding to the section line IV-IV of FIG. 3.

FIG. 3 and FIG. 4 depict a variation of the seal arrangement 10, with FIG. 4 being a sectional depiction corresponding to the section line IV-IV of FIG. 3. The first sheet-metal element 40 only partially bridges the separation AB between the two components 12, 14, or between their securing sections 18, 24, In addition, the second component 14 has a second sheet-metal element 60 which partially bridges the separation AB from the other direction. The properties described above for the first sheet-metal element 40, with respect to the U-shaped profile and securing by means of rivets 42, also apply for the second sheet-metal element 60 and will not be repeated here. A residual separation RA remains between the first sheet-metal element 40 and the second sheet-metal element 60, which each bridge the separation AB only partially. In order to bridge, or seal, the residual separation RA, there is provided a sealing body 62 (depicted by hatching). The sealing body 62 is accommodated or mounted both in the first sheet-metal element 40 and also in the second sheet-metal element 60. The sealing body 62 can be produced from a suitable material, it can in particular be made of a ceramic material or a metal. Also in this variation of the seal arrangement 10, the components 12, 14 are displaceable relative to one another, in particular they are also displaceable relative to the sealing body 62 which is accommodated between them.

The first component 12 and/or the second component 14 can have an increased material thickness 70 in the region of the overlapping sections 26, 28. In the present examples of FIGS. 1 to 4, an increased material thickness 70 is depicted in each case in a simplified schematic manner on each overlapping section 26, 28. The increased material thickness on the CMC components 12, 14 serves in particular to be able to even out tolerances. In that context, it is possible, when necessary, to remove material in the region of the increased material thickness 70 without having to accept damage to the structure of the respective component 12, 14. By virtue of the increased material thickness 70 and the possibility of removing this, the overlaps can be designed with an exact fit, making it possible to achieve the best possible seal.

FIG. 1 and FIG. 3 show the components 12, 14 as curved components which are part of an essentially annular overall structure of a turbine intermediate casing. However, such a seal arrangement is not restricted to connecting curved components. Rather, it may also be used in the context of straight components which require sealing while at the same time allowing the components to shift relative to one another.

LIST OF REFERENCE SIGNS 10 seal arrangement
12 first component
14 second component
16 first bounding section
18 first securing section
20 structural component
22 second bounding section
24 second securing section
26 first overlapping section
28 second overlapping section
30 first end
32 second end
40 first sheet-metal element
41 slot-shaped opening
42 rivet connection
44 limb
46 limb
48 arc
50 underside
52 engagement section
60 second sheet-metal element
62 sealing body
70 increased material thickness

What is claimed is:

1. A seal arrangement, wherein the seal arrangement comprises a first component and a second component, the first component comprising a first bounding section with a first overlapping section as well as a first securing section that is connected to and projects from the first bounding section, the second component comprising a second bounding section with a second overlapping section as well as a second securing section that is connected to and projects from the second bounding section, the first overlapping section and the second overlapping section being arranged at least partially overlapping such that the first bounding section and the second bounding section form an essentially continuous bounding surface, a separation provided between the first securing section and the second securing section is at least partially sealed by at least one seal element, and wherein the first and second components are made of a ceramic fiber composite material and the seal element comprises at least one first sheet-metal element arranged along the first securing section and at least partially bridging the separation between the first securing section and the second securing section.

2. The seal arrangement of claim 1, wherein the first sheet-metal element completely bridges the separation.

3. The seal arrangement of claim 2, wherein an engagement section of the second securing section is received displaceably in the first sheet-metal element.

4. The seal arrangement of claim 1, wherein the seal element further comprises at least one second sheet-metal element which is arranged along the second securing section and partially bridges the separation to the first securing section.

5. The seal arrangement of claim 4, wherein a sealing body is received between the first sheet-metal element and the second sheet-metal element, which sealing body bridges a residual separation remaining between e first sheet-metal element and the second sheet-metal element.

6. The seal arrangement of claim 4, wherein the second sheet-metal element is essentially U-shaped.

7. The seal arrangement of claim 5, wherein the second sheet-metal elements essentially U-shaped.

8. The seal arrangement of claim 1, wherein the first sheet-metal element is essentially U-shaped.

9. The seal arrangement of claim 6, wherein the first sheet-metal element is essentially U-shaped.

10. The seal arrangement of claim 7, wherein the first sheet-metal element is essentially U-shaped.

11. The seal arrangement of claim 1, wherein the first sheet-metal element is connected to the first securing section by a rivet connection.

12. The seal arrangement of claim 4, wherein the second sheet-metal element is connected to the second securing section by a rivet connection.

13. The seal arrangement of claim 12, wherein the first sheet-metal element is connected to the first securing section by a rivet connection.

14. The seal arrangement of claim 1, wherein an increased material thickness is provided on the first overlapping section.

15. The seal arrangement of claim 1, wherein an increased material thickness is provided on the second overlapping section.

16. The seal arrangement of claim 14, wherein an increased material thickness is provided on the second overlapping section.

17. The seal arrangement of claim 1, wherein the first component and the second component are arranged in a turbine intermediate casing of a gas turbine such that the first bounding section and the second bounding section bound a hot gas duct, and such that the first securing section and the second securing section are connected to structural elements of the turbine intermediate casing.

18. A turbine intermediate casing for a gas turbine, wherein the casing comprises multiple components which are arranged next to one another in circumferential direction, partially overlap one another and bound a hot gas duct, and further comprises at least one seal arrangement according to claim 1, the first component and the second component being adjacent in the circumferential direction.

19. The turbine intermediate casing of claim 18, wherein the first securing section and the second securing section project from the first bounding section and, respectively, from the second bounding section essentially in radial direction.

* * * * *